United States Patent
Sprague et al.

(10) Patent No.: US 9,040,923 B2
(45) Date of Patent: May 26, 2015

(54) EYE TRACKING SYSTEM AND RELATED METHODS

(71) Applicant: Innovega Inc., Hansville, WA (US)

(72) Inventors: Randall B. Sprague, Hansville, WA (US); Arthur Zhang, Hansville, WA (US)

(73) Assignee: Innovega, Inc., Hansville, WA (US)

(*) Notice: Subject to any disclaimer, the term of this patent is extended or adjusted under 35 U.S.C. 154(b) by 0 days.

(21) Appl. No.: 14/018,243

(22) Filed: Sep. 4, 2013

(65) Prior Publication Data

US 2014/0138544 A1    May 22, 2014

Related U.S. Application Data

(60) Provisional application No. 61/696,624, filed on Sep. 4, 2012.

(51) Int. Cl.
*G01J 5/02* (2006.01)
*G06F 3/01* (2006.01)

(52) U.S. Cl.
CPC ........................................ *G06F 3/013* (2013.01)

(58) Field of Classification Search
CPC .................................................... G06F 3/013
USPC ............................................. 250/341.1–341.8
See application file for complete search history.

(56) References Cited

U.S. PATENT DOCUMENTS

| | | | | |
|---|---|---|---|---|
| 4,373,787 A | * | 2/1983 | Crane et al. | 351/210 |
| 4,720,189 A | * | 1/1988 | Heynen et al. | 351/210 |
| 5,980,041 A | * | 11/1999 | Strachan | 351/210 |
| 6,659,611 B2 | * | 12/2003 | Amir et al. | 351/210 |
| 7,982,765 B2 | * | 7/2011 | Lewis et al. | 348/98 |
| 8,314,707 B2 | * | 11/2012 | Kobetski et al. | 340/575 |
| 2009/0182311 A1 | * | 7/2009 | Gertner et al. | 606/4 |
| 2009/0273562 A1 | * | 11/2009 | Baliga et al. | 345/157 |
| 2010/0245093 A1 | * | 9/2010 | Kobetski et al. | 340/576 |
| 2012/0215155 A1 | * | 8/2012 | Muller et al. | 604/20 |
| 2013/0120712 A1 | * | 5/2013 | Spasovski | 351/209 |

* cited by examiner

*Primary Examiner* — Kiho Kim
(74) *Attorney, Agent, or Firm* — Viksnin Harris & Padys PLLP (57) ABSTRACT

A tracking system for tracking an eye including a light source projecting light toward a display surface in a sequential pattern, one or more reflectors associated with an optical device, where the one or more reflectors reflect the pulses of light from the display source, one or more photo detectors, where the photo detectors detect reflected pulses of light from the light source, and a system that measures pulse timing relative to horizontal and vertical pattern to compute a gaze angle of the eye.

20 Claims, 11 Drawing Sheets

EYE TRACKING SYSTEM AND RELATED METHODS

RELATED APPLICATIONS

This application claims the benefit of U.S. provisional patent application Ser. No. 61/696,624 filed Sep. 4, 2012, which is incorporated herein by reference in its entirety.

FIELD OF THE INVENTION

This document is related to an eye tracking system and related methods, and further related to eye contacting optics used with the eye tracking system.

TECHNICAL BACKGROUND

Tracking eye movement is helpful in many situations such as head mounted displays or in technologies requiring hands-free control.

Previous eye tracking devices require arrays of photo detectors in order to track the movement of the eye.

SUMMARY

A tracking system for tracking an eye including a light source projecting light, one or more reflectors associated with an optical device, where the one or more reflectors reflect the light toward the one or more photo detectors, where the photo detectors detect reflected light from the light source, and a system that measures pulse timing relative to horizontal and vertical projected light to compute a gaze angle of the eye.

The optical device can include one or more of a contact lens, or an intraocular device, and the reflectors can be integrated into the device. The light source includes, but is not limited to, an infrared light source, a scanned beam projector, a laser, infrared laser, RGB laser, or collimated LED. In an option, one or more photo detectors are disposed outside of a projected image area of a display. Optionally, the system can be adjusted using a high gain circuit, or intensity of the light source.

In another embodiment, a method includes projecting a light source on a display, reflecting the light from the light source from the display to one or more reflectors associated with a body component, such as an eye, reflecting light from the reflector to one or more photo detectors, and measuring timing between photo detector pulses and tracking movement of the body component.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

Details are provided in accordance with one or more various embodiments, and are described in detail with reference to the following figures. The drawings are provided for purposes of illustration only and merely depict typical or example embodiments. These drawings are provided to facilitate the reader's understanding of the embodiments and shall not be considered limiting of the breadth, scope, or applicability of the embodiments.

DETAILED DESCRIPTION

Systems, methods, and processes for constructing an eye tracking system, such as, but not limited to, eye contacting optics enabled eye tracking.

Figure 1:
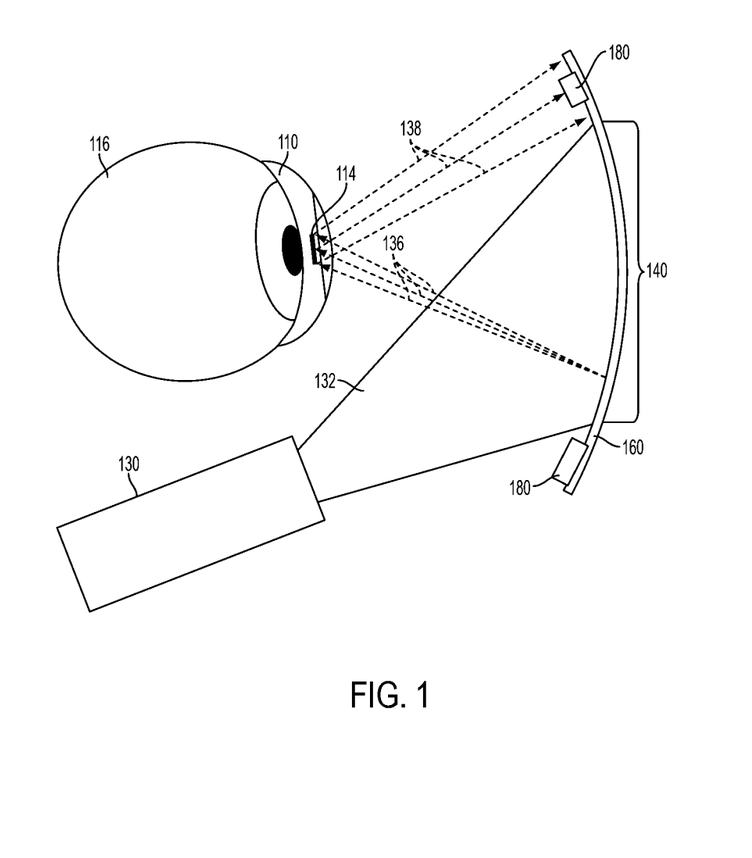
FIG. 1 illustrates a system diagram of the eye tracking system in accordance with one or more embodiments.
Figure 11:
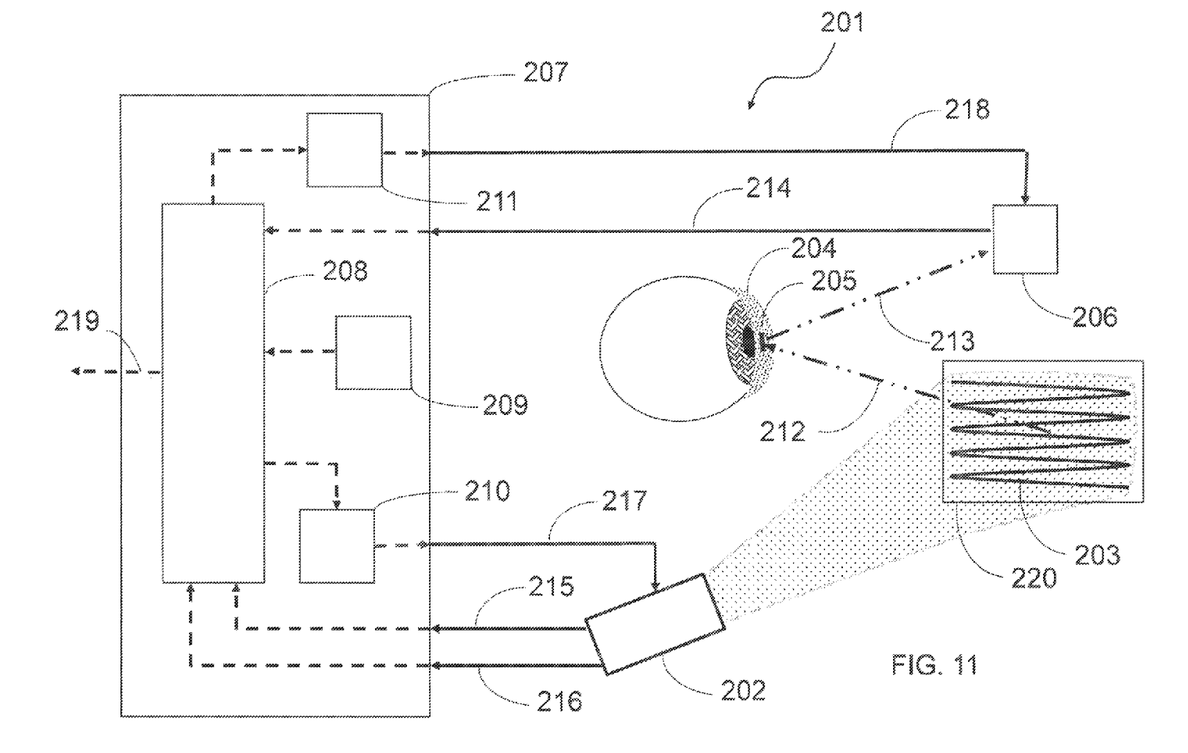
FIG. 11 illustrates a block diagram of the eye tracking system in accordance with one or more embodiments.

An eye tracking system 100, as shown in FIGS. 1 and 11, includes, for example, a light source 130, such as a laser scanning projector, an image screen 160, and eye contacting optics 110, such as a contact lens, and one or more photo detectors 180. The eye tracking system 100 can be used with an apparatus to receive and process display information and non-display information in accordance with one or more of the following applications, which are hereby incorporated by reference in their entirety:

U.S. patent application Ser. No. 12/204,567 filed Sep. 4, 2008; U.S. patent application Ser. No. 12/432,638 filed on Apr. 29, 2009; U.S. patent application Ser. No. 12/485,817 filed on Jun. 16, 2009; U.S. patent application Ser. No. 12/695,877 filed on Jan. 28, 2010; U.S. patent application Ser. No. 12/756,984 filed on Apr. 8, 2010; U.S. patent application Ser. No. 12/767,329 filed on Apr. 26, 2010; U.S. patent application Ser. No. 13/354,102 filed on Jan. 19, 2012; and U.S. patent application Ser. No. 13/370,877 filed on Feb. 10, 2012.

The system 100 includes a light source 130, such as a laser scanning projector, is used to project light 132 on to an image screen. The light 132 is projected on to a projected image area 140 of the image screen 160 or display. Examples of light sources include, but are not limited to, a scanned beam projector, laser, RGB laser, or collimated LED, infrared light source, raster scanner, or infrared laser, or combinations thereof. The light scans sequentially one pixel at a time, with a known rate, and/or in a known pattern. In one or more embodiments, the light source pulses at a particular rate. In an embodiment, an infrared laser is added to a RGB scanning projector and a continuous infrared image is scanned onto the image screen, along with the RGB modulated image. The timing of the light that is projected is well-correlated to its position, such as X, Y position. For example, the light is projected in a sinusoidal shape with a known rate, such as, but not limited to a sequential, pulse, and/or refresh rate. The light reflects off of the display surface toward the eye, and the light reflects off reflector(s) in the optical device toward the photo detectors. Since the light is reflected by the eye, the position of the eye is determined at a particular point in time.

The light 132 is reflected toward a body component, such as an eye 116 from the display surface 160. The scanned light floods the eye with light, where example rays are shown at 136. The eye 116 has an optical device associated therewith. The optical device includes, but is not limited to, contact lens, intraocular device, or devices in contact with an eye. The term optical device includes eye contacting optics which further includes optical system that has optical elements and is in contact with the ocular tissue. This includes any hybrid, gas permeable, soft, hard, corneal, or scleral contact lens, and any inter-ocular, intra-corneal or intra-ocular device. Though the embodiments to follow are described in terms of a contact lens, one of ordinary skill in the art will appreciate after reading the following description that any of the optical systems described above could be used in place of a contact lens without deviating from the scope or principles of the present invention.

One or more reflectors are associated with the optical device 110, as shown in FIGS. 1, 4, 5, and 7. The one or more reflectors 114 are used to reflect at least some of the light 136 directed to the eye 116 away from the eye 116 and toward photo detectors 180. In an embodiment, the reflector does not reflect a significant amount of light from the light source 130 to the photo detectors 180. Examples of the reflected light are shown at 138.

Figure 4A:
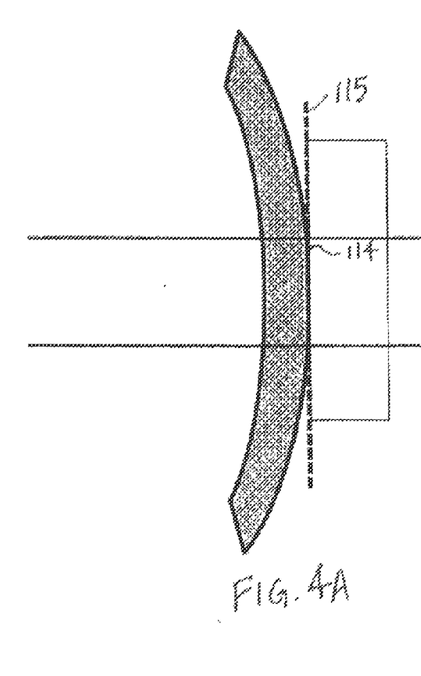
FIG. 4A illustrates a side view of an optical device for use with the eye tracking system in accordance with one or more embodiments.
Figure 4B:
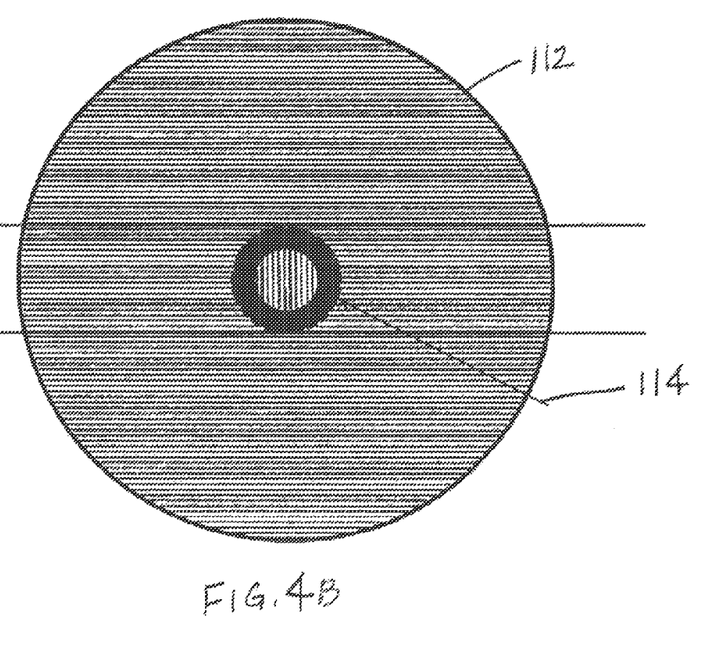
FIG. 4B illustrates a front view of an optical device for use with the eye tracking system in accordance with one or more embodiments.

In an embodiment, the optical device 110 is a contact lens having one or more reflectors 114 integrated therein. FIGS. 4A and 4B illustrate a single reflector 114. For example, the single reflector 114 is substantially centered about the iris of the eye, for example in the shape of a ring. In one or more embodiments, an outer plane 115 is defined by a plane perpendicular to a radius substantially centered in the lens 112. In one or more embodiments, the reflector 114 is parallel with plane 115, as shown in FIG. 4A.

Figure 5A:
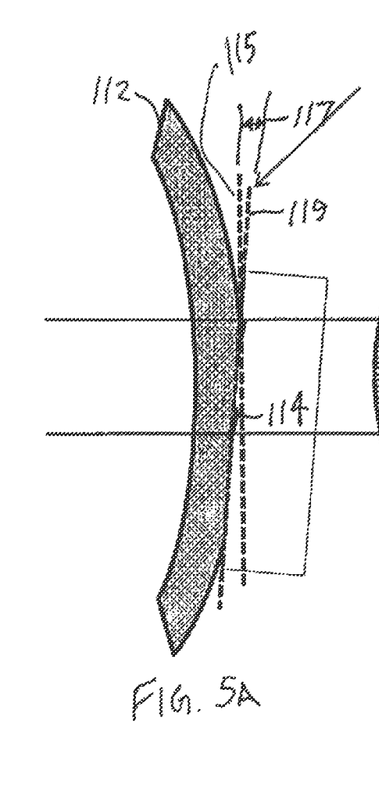
FIG. 5A illustrates a side view of an optical device for use with the eye tracking system in accordance with one or more embodiments.
Figure 5B:
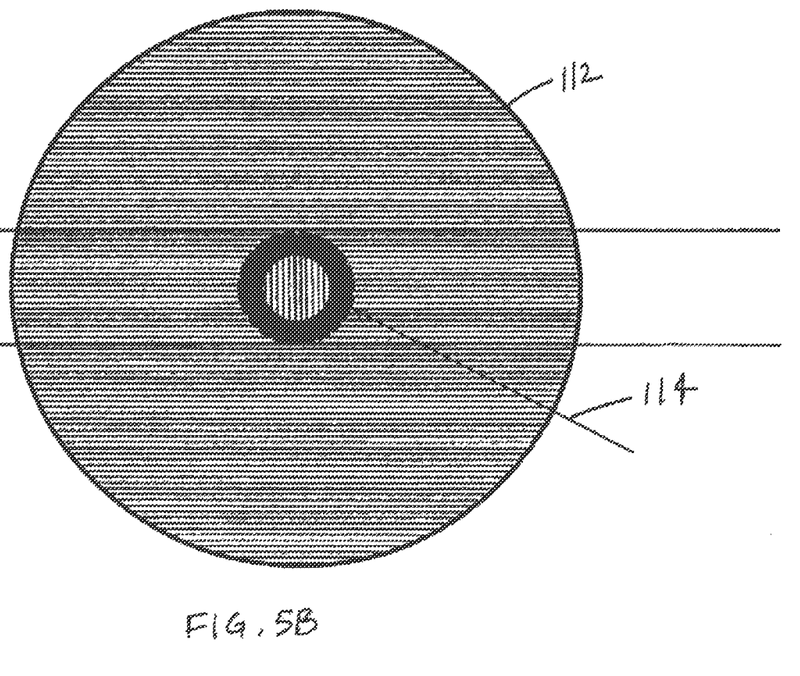
FIG. 5B illustrates a front view of an optical device for use with the eye tracking system in accordance with one or more embodiments.
Figure 6:
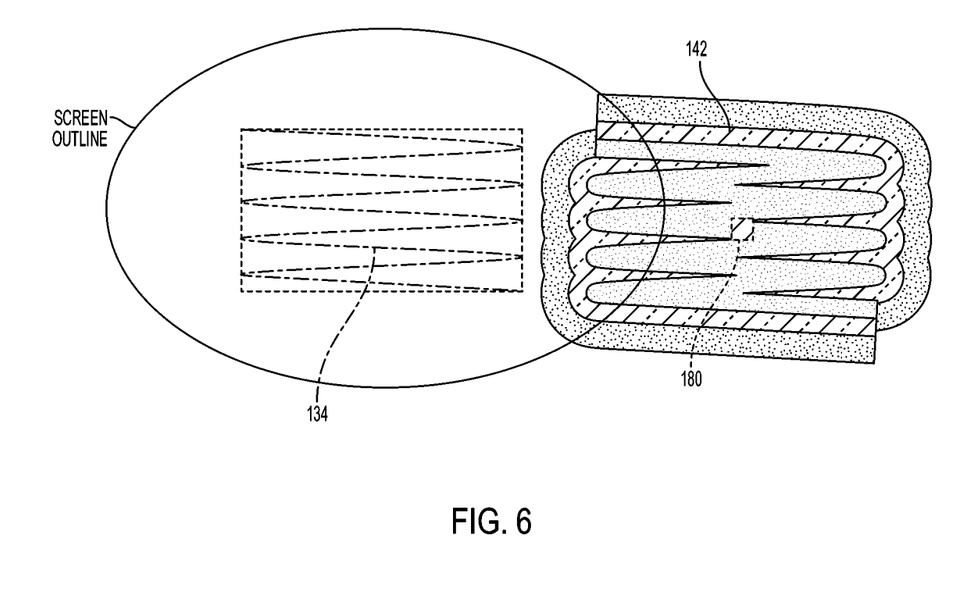
FIG. 6 illustrates a scan pattern of the eye tracking system in accordance with one or more embodiments.

Referring to FIGS. 5A and 5B, a single reflector 114 is shown. The reflector is parallel with angled plane 119. In one or more embodiments, angled plane 119 is angled relative to outer plane 115 in the range of 0-30 degrees, 117. Having the angled plane assists in allowing the detectors to be placed off to the side, avoiding interference with vision of the user. FIG. 6 illustrates the scan pattern 142 reflected from the angled reflector 114.

In one or more embodiments, multiple reflectors 114 are integrated with the optical device 110 to ensure enough dynamic range. Dynamic range can be increased by increasing the number of reflectors 114. The multiple reflectors, in one or embodiments, reflect multiple images overlapping on the one or more photo detectors, for example as shown in FIGS. 8 and 9.

Figures 7A, 7B:
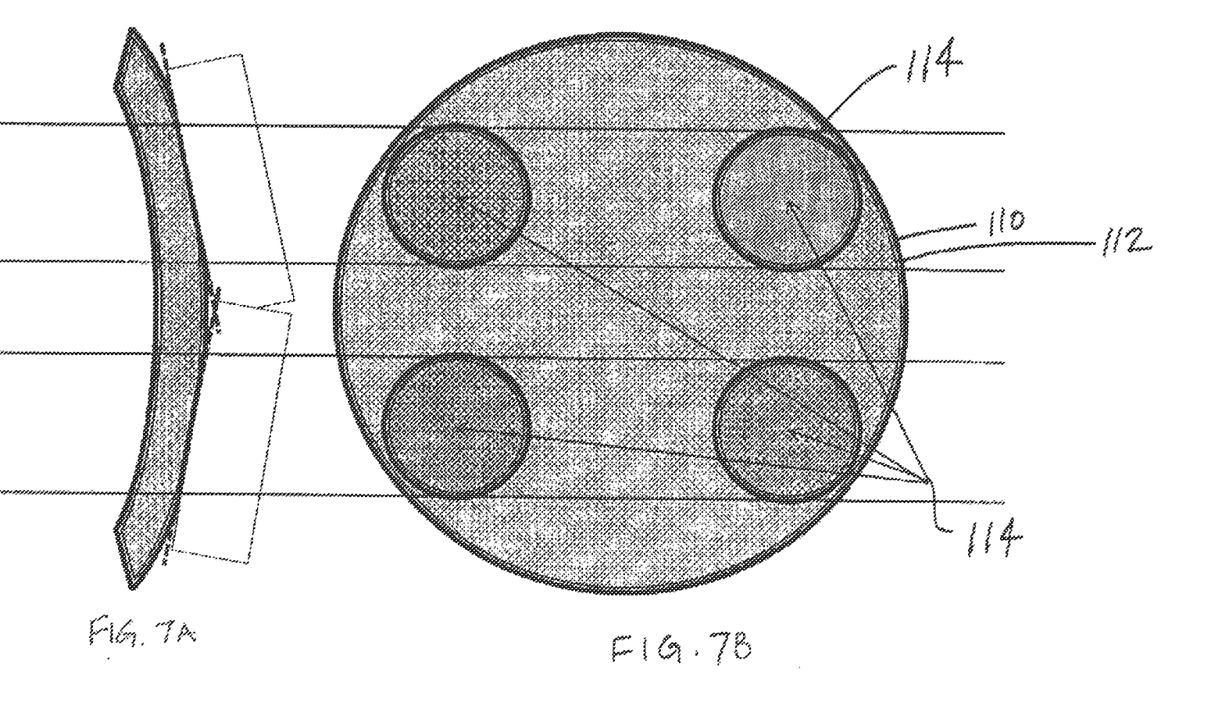
FIG. 7A illustrates a side view of an optical device for use with the eye tracking system in accordance with one or more embodiments.
FIG. 7B illustrates a front view of an optical device for use with the eye tracking system in accordance with one or more embodiments.
Figure 8:
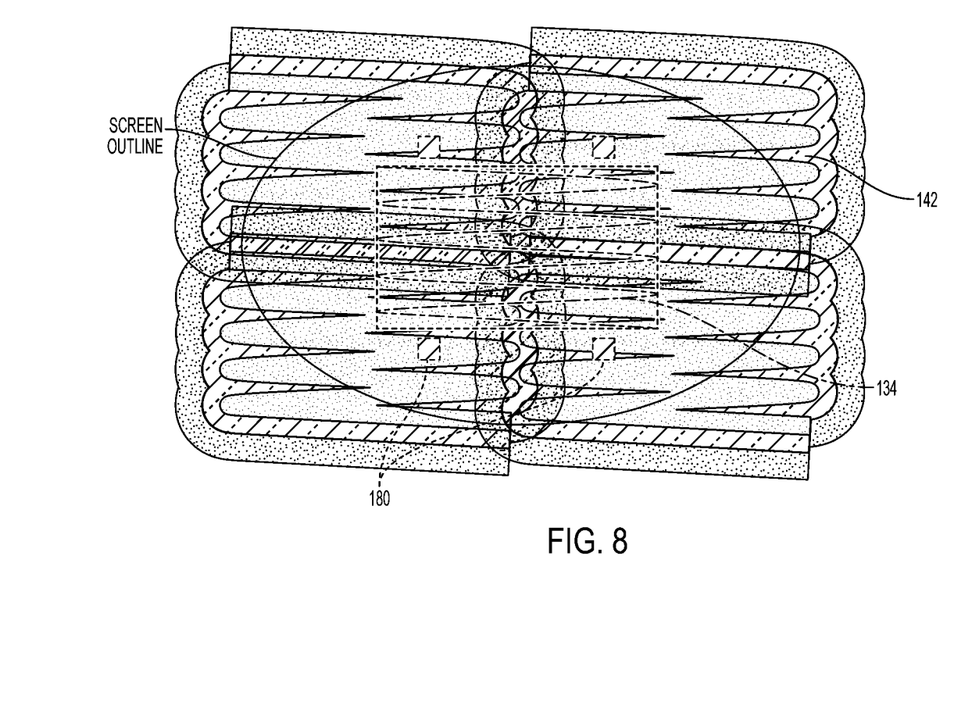
FIG. 8 illustrates a scan pattern of the eye tracking system in accordance with one or more embodiments.
Figure 9:
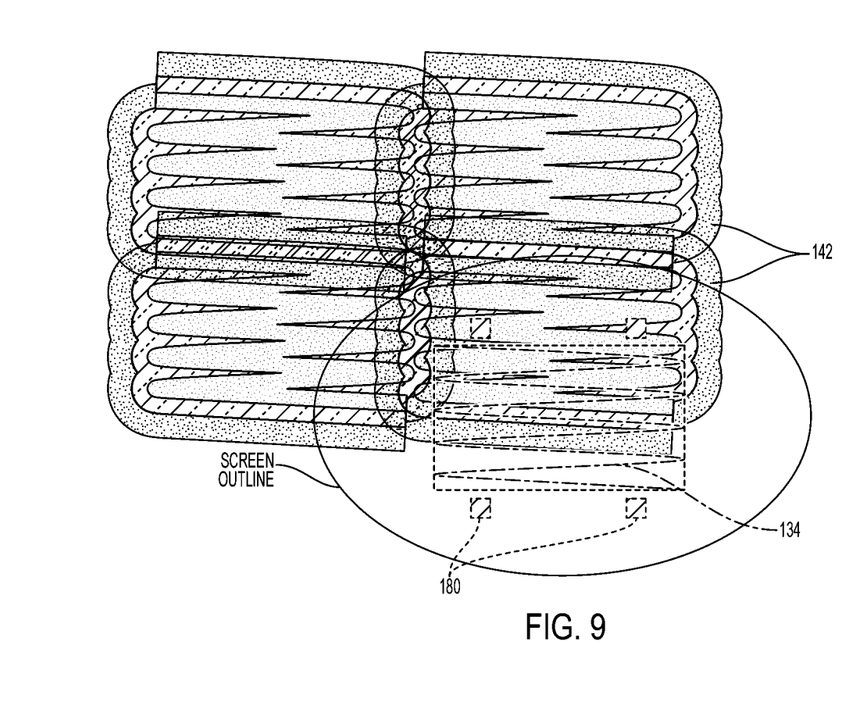
FIG. 9 illustrates a scan pattern of the eye tracking system in accordance with one or more embodiments.

FIGS. 8 and 9 illustrate scan patterns on a screen from multiple reflectors 114. FIG. 8 illustrates an example of scan patterns on a surface of a display or screen with the eye looking straight ahead, and FIG. 9 illustrates an example of scan patterns on a surface of a display or screen with the eye looking up and to the left. In one or more embodiments, three or more reflectors 114 are disposed about the central region of the contact lens or optical device. In one or more embodiments, four reflectors 114 are disposed on, in, or near the contact lens, as shown in FIG. 7B. In one or more embodiments, the reflectors include a first pair of reflectors angled at a first angle, and a second pair of reflectors angled a second angle, as shown in FIG. 7A.

In one or more embodiments, an outer plane 115 is defined by a plane perpendicular to a radius substantially centered in the lens 112. In one or more embodiments, the reflector 114 is angled or slanted relative to the plane 115. In one or more embodiments, the reflectors 114 is angled or slanted relative to a plane parallel with the outer most point of the lens 112. With the angled reflector, when the user is looking straight ahead, the reflected light is off to the side. Thus, using an angled reflector 114 allows for placement of the photo detectors 180 to be off to one side. For example, in embodiments where the display includes devices such as glasses or goggles with frame(s) and lens, it allows for placing photo detectors on eyewear frames rather than on a spectacle lens.

In one or more embodiments, the reflector is a first polarization selective reflector, and the polarization of the light source, such as an infrared laser, is set to be reflected by the first polarization selective reflector. In a further embodiment, a second polarization selective reflector is proximate to the first polarization selective reflector, and optionally the second polarization selective reflector is orthogonal to the first polarization selective reflector.

Figure 2:
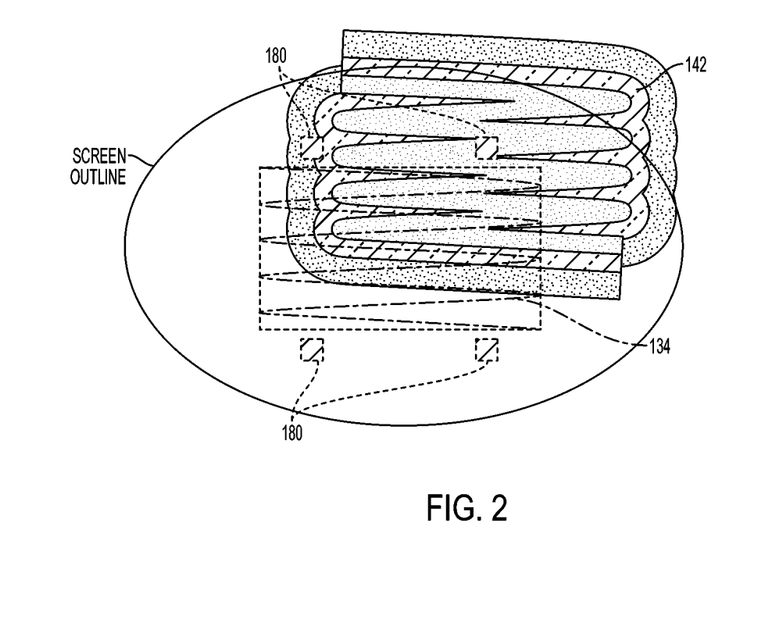
FIG. 2 illustrates a scan pattern of the eye tracking system in accordance with one or more embodiments.
Figure 3:
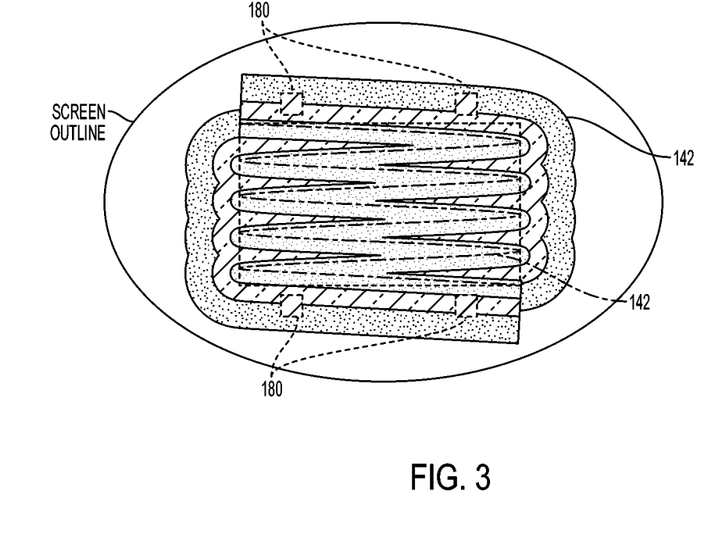
FIG. 3 illustrates a scan pattern of the eye tracking system in accordance with one or more embodiments.

The photo detectors 180 are illuminated by different pixels of the image reflected by the reflector 114 depending on the eye gaze angle, as shown in FIGS. 2 and 3. FIG. 2 illustrates a scan pattern 142 reflected from the reflector 114 of the contact lens 112, where 134 shows the scan pattern projected onto the screen 160, and the eye is looking generally up and to the right. The projected light is reflected off of the display to the eye, and reflected back from the reflector of the contact lens. The position of the reflected light is a function of the eye gaze angle. Since the eye is looking up to the right, the scan pattern reflected from the lens is up and to the right.

FIG. 3 illustrates a scan patter projected on the screen 160, and the eye is looking generally straight ahead. In one or more embodiments, the photo detectors are filtered to detect only infrared light. For example, the photo detectors do not detect ambient light that bounces off of the eye. In another embodiment, the one or more photo detectors 180 are disposed outside of a projected image area of a display.

The photo detectors 180 detect the reflected image from the eye. Typically, all of the photo detectors are not all illuminated for all angles of the eye. For example, in an embodiment, at least two photo detectors are illuminated over a range of normal eye motion, and/or at least one photo detector is illuminated over a range of large eye motion. The size of the reflected light is a function of the reflector diameter, reflector curvature, and/or the lensing effect from the curved contact lens polymer disposed over the reflector. In an example, the reflected scan pattern 142 moves about 2 degrees for every 1 degree of eye rotation.

Figure 10:
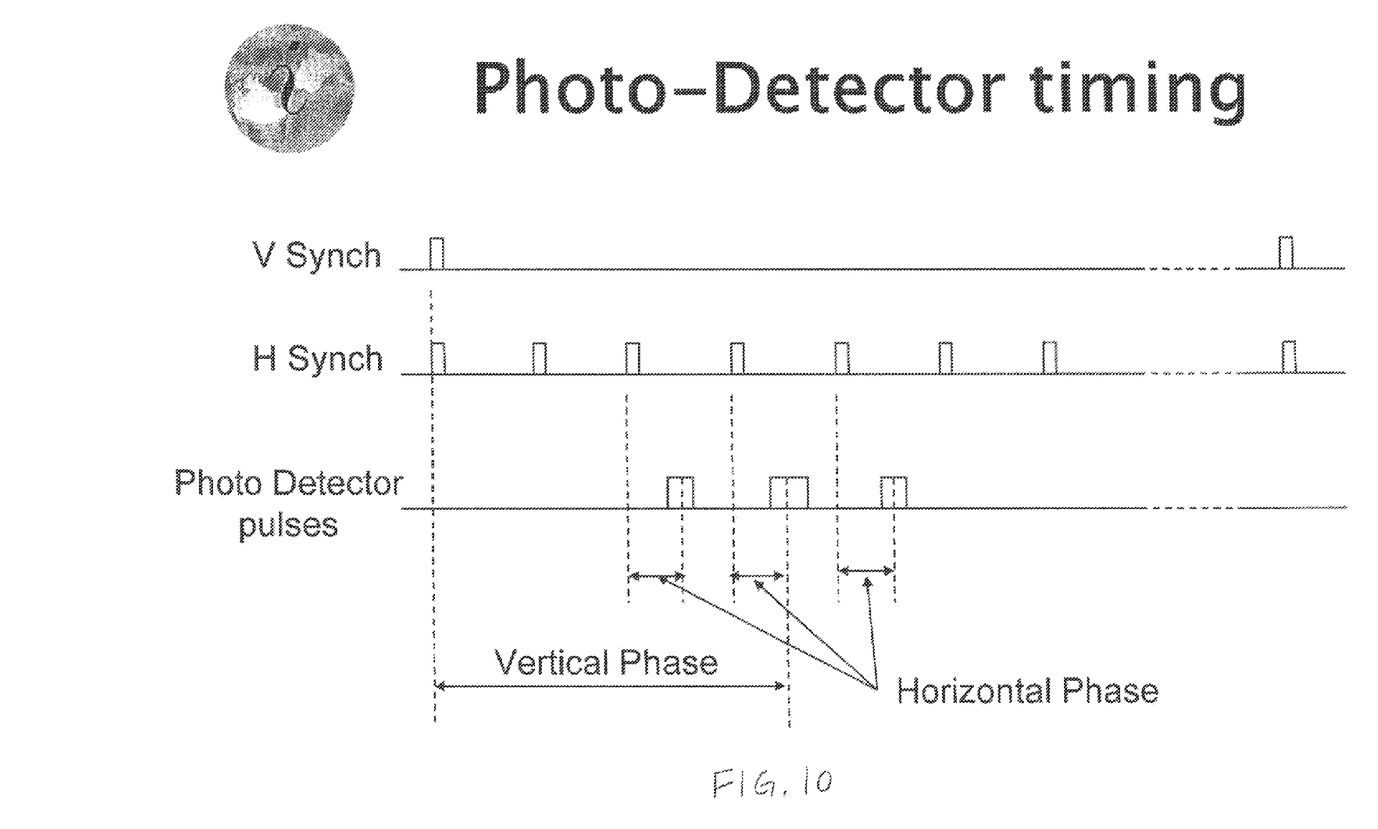
FIG. 10 illustrates a timing diagram of the eye tracking system in accordance with one or more embodiments.

Timing of the photo detector pulses can be correlated to the pattern of the light, such as the horizontal and/or vertical position, and/or pulses of the light source, as shown in FIG. 10. For every X, Y position, the instantaneous time is known. For example, the photo detector blips are correlated to the horizontal and vertical synch pulses to determine the X, Y position of the reflected image, which can further be used to determine and measure the gaze angle of the eye using a system, such as an electronics system. The reflected spot will illuminate a photo detector 180 for many pixels along a scan row. The reflected spot will illuminate a photo detector for several rows of scanning in the vertical direction. The X dimension is determined by measuring the timing of the center of the photo detector blips relative to the horizontal synch pulse. The Y dimension is determined by measuring the timing of the center row of the series of blips in the vertical dimension relative to the vertical synch pulse.

Referring to FIG. 11, a block diagram of the eye tracking system 201 is shown. The eye tracking system includes, but is not limited to, light source 202, sequentially scanned light pattern 203, optical device 204, reflector 205, photo-detector(s) 206, timing measuring system 207, timing logic circuitry 208, time base circuitry (clock) 209, light source power control circuitry 210, photo-detector gain control, circuitry 211, sequentially scanned light element 212, reflected light pulse 213, photo detector, output signal 214, light source vertical sync 215, light source horizontal sync 216, light source power control signal 217, photo-detector gain control signal 218, eye tracking system output 219, where several of the components are described above and below.

The light source 202, sequentially scanned light pattern 203, optical device 204, reflector 205, photo detector(s) 206, timing measuring system 207, timing logic circuitry 208, time base circuitry (clock) 209, light source power control circuitry 210, photo detector gain control circuitry 211, sequentially scanned light 212, reflected light pulse 213, photo detector output signal 214, light source vertical sync 215, light source horizontal sync 216, light source power control signal 217, photo detector gain control signal 218, eye tracking system output 219, and a display surface 220.

The light source 202 projects light toward the display surface 220 in a known, predetermined pattern 203. The display surface 220 directs the sequentially scanned light 212 toward the optical device 204. The optical device 204 includes one or more reflectors 205, which reflect the scanned light 212 toward photo detector 206, which pulses to sense the light directed thereto. In one more embodiments, the system 201 further includes a system to measuring pulse timing relative to the projected light pattern, such as the horizontal and vertically projected light pattern. In one or more embodiments, the system to measure includes timing measuring system 207 including, but not limited to a programmable logic device, such as timing logic circuitry 208 and/or time base circuitry 209.

In one or more embodiments, the system 207 further includes light source power control circuitry 210 and/or photo detector gain control circuitry 211, which allows for the light source intensity to be modified and/or the gain of the photo detector to be modified. For example, the light source power control circuitry 210 sends a light source power control signal 217 to the light source 202 to control the timing and intensity.

The system 201 uses the light source vertical sync 215, the light source horizontal sync 216, and the photo detector output signal 214 to determine the gaze angle of the eye at a particular time, and can output the data using output 219.

In one or more embodiments, a method for eye tracking is disclosed herein. In one or more embodiments, a method includes projecting a light, such as, but not limited to, a pulsed light source on a display surface of a display, reflecting the light from the light source from the display, such as a display surface, to one or more reflectors associated with a body component, for example the human eye. In one or more options, the display surface can have a coating thereon. In one or more embodiments, the reflectors are mounted on, in, or near a component mounted on, in or near the body component, such as, but not limited to, a contact lens on or in the eye.

The method further includes reflecting light from the reflector to one or more photo detectors, measuring timing between photo detector pulses and tracking movement of the body component, such as human eye. The photo detectors, in one or more embodiments, are associated with a display. For example, the photo detectors are mounted on, in or near a display. The detectors can be molded within the display and/or mechanically coupled, bonded with the display.

In one or more embodiments, the method includes measuring timing of photo detector pulses relative to a refresh rate of the pulsed light source. In one or more embodiments, projecting the light source, such as the pulsed light source includes projecting a laser, a RGB light source, LED, infrared light source, or a combination thereof. The light sources can be mounted to a portion of the display. For example, the display can include eye wear frames, and the light source can be mounted on a portion of the frame.

The scanned laser beam from the light source is scanned sequentially one pixel at a time, moving in a sinusoidal direction, back and forth on to a display surface. For every x,y position of the pixel, the instantaneous timing and location is known, and therefore the orientation of the eye is known at a given time, and eye movement can be tracked. The projected light in one or more embodiments includes light that is projected horizontally and/or vertically, and optionally pulsed.

In one or more embodiments, the method includes adjusting an intensity of the light source to optimize light received by the one or more photo detectors. In one or more embodiments, the method includes setting a light threshold for generating output pulses using, for example, a gain adjustment circuit. The threshold of the photo detector can be set high or low. For example, if the system is used in a dark setting, the light source can be set to a lower setting, and the sensitivity of the photo detector can be turned up. In another setting, the light source can be turned to a high setting, and the sensitivity of the photo detector can be turned down, to assist, for example, with noise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

What is claimed is:

1. A tracking system for tracking an eye, the system comprising:
   a light source to project light scanned sequentially in a pattern;
   four reflectors associated with an optical device, the four reflectors to reflect light;
   one or more photo detectors, the photo detectors to detect reflected light from the light source; and
   a system to measure pulse timing relative to horizontal and vertical projected light pattern.

2. The tracking system as recited in claim 1, further comprising a display, wherein the light source is projected toward a surface of the display.

3. The tracking system as recited in claim 1, wherein the tracking system computes gaze angle of the eye.

4. The tracking system as recited in claim 1, wherein the light source includes a scanned beam projector.

5. The tracking system as recited in claim 1, wherein the light sources include one or more of a laser, infrared light source, infrared laser, RGB laser, or collimated LED.

6. The tracking system as recited in claim 1, wherein the one or more photo detectors are disposed outside of a projected image area of a display.

7. The tracking system as recited in claim 1, further comprising multiple reflectors associated with the optical device.

8. A tracking system for tracking an eye, the system comprising:
   a light source to project light scanned sequentially in a pattern;
   one or more reflectors associated with an optical device, the one or more reflectors to reflect light;
   one or more photo detectors, the photo detectors to detect reflected light from the light source; and
   a system to measure pulse timing relative to horizontal and vertical projected light pattern, wherein the optical device includes one or more of a contact lens, or an intraocular device.

9. A tracking system for tracking an eye, the system comprising:
   a light source to protect light scanned sequentially in a pattern;
   one or more reflectors associated with an optical device, the one or more reflectors to reflect light;
   one or more photo detectors, the photo detectors to detect reflected light from the light source; and
   a system to measure pulse timing relative to horizontal and vertical projected light pattern, wherein the reflectors are integrated into a contact lens.

10. A tracking system for tracking an eye, the system comprising:
    a light source to project light scanned sequentially in a pattern;
    one or more reflectors associated with an optical device, the one or more reflectors to reflect light;
    one or more photo detectors, the photo detectors to detect reflected light from the light source; and
    a system to measure pulse timing relative to horizontal and vertical projected light pattern, wherein the light sources include one or more of a laser, infrared light source, infrared laser, RGB laser, or collimated LED and the reflector is a first polarization selective reflector and a polarization of the infrared laser is set to be reflected by the first polarization selective reflector.

11. A tracking system for tracking an eye, the system comprising:
    a light source to project light scanned sequentially in a pattern;
    one or more reflectors associated with an optical device, the one or more reflectors to reflect light;
    one or more photo detectors, the photo detectors to detect reflected light from the light source;
    a system to measure pulse timing relative to horizontal and vertical projected light pattern, wherein the light sources include one or more of a laser, infrared light source, infrared laser, RGB laser, or collimated LED and the reflector is a first polarization selective reflector and a polarization of the infrared laser is set to be reflected by the first polarization selective reflector; and
    a second polarization selective reflector is proximate to the first polarization selective reflector, wherein the second polarization selective reflector is orthogonal to the first polarization selective reflector.

12. A tracking system for tracking an eye, system comprising:
    a light source to project light scanned sequentially in a pattern;
    one or more reflectors associated with an optical device, the one or more reflectors to reflect light;
    one or more photo detectors, the photo detectors to detect reflected light from the light source;
    a system to measure pulse timing relative to horizontal and vertical projected light pattern; and
    multiple reflectors associated with the optical device, wherein the multiple reflectors reflect multiple images overlapping on the one or more photo detectors.

13. A tracking system for tracking an eye, the system comprising:
    a light source to project light scanned sequentially in a pattern;
    one or more reflectors associated with an optical device, the one or more reflectors to reflect light;
    one or more photo detectors, the photo detectors to detect reflected light from the light source; and
    a system to measure pulse timing relative to horizontal and vertical projected light pattern,
    wherein an intensity of the light source is adjusted to optimize light received by the one or more photo detectors.

14. A tracking system for tracking an eye, the system comprising:
    a light source to project light scanned sequentially in a pattern;
    one or more reflectors associated with an optical device, the one or more reflectors to reflect light;
    one or more photo detectors, the photo detectors to detect reflected light from the light source; and
    a system to measure pulse timing relative to horizontal and vertical projected light pattern, wherein the one or more photo detectors have a gain adjustment circuit for setting light threshold for generating output pulses.

15. A tracking system for tracking an eye, the system comprising:
 a light source to project light scanned sequentially in a pattern;
 one or more reflectors associated with an optical device, the one or more reflectors to reflect light;
 one or more photo detectors, the photo detectors to detect reflected light from the light source;
 a system to measure pulse timing relative to horizontal and vertical projected light pattern; and
 a display, wherein the light source is projected toward a surface of the display, and the surface of the display to direct the light toward the optical device.

16. A method for tracking an eye, the method comprising:
 projecting a light source on a display;
 reflecting the light from the light source from the display to one or more reflectors associated with a component, the component to be mounted near a human eye; reflecting light from one or more reflectors to one or more photo detectors; and
 measuring timing between photo detector pulses to track movement of the human eye.

17. The method as recited in claim 16, wherein the method comprises measuring timing of photo detector pulses relative to a refresh rate of the light source.

18. The method as recited in claim 16, wherein projecting the light source includes projecting horizontal and vertical pulses.

19. The method as recited in claim 16, wherein projecting the light source includes projecting a laser, a RGB light source, or a combination thereof.

20. The method as recited in claim 16, wherein projecting the light source includes projecting an infrared light source.

* * * * *